United States Patent [19]
Matsui et al.

[11] Patent Number: 6,028,636
[45] Date of Patent: *Feb. 22, 2000

[54] IMAGE CODING APPARATUS USING DETECTION OF FIELD CORRELATION

[75] Inventors: Izumi Matsui, Kawasaki; Akiyoshi Hamanaka, Hachioji; Yukinori Yamamoto, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/534,828

[22] Filed: Sep. 27, 1995

[30] Foreign Application Priority Data

Sep. 30, 1994 [JP] Japan .................................... 6-261897
Sep. 30, 1994 [JP] Japan .................................... 6-261898

[51] Int. Cl.[7] ...................................................... H04N 7/30
[52] U.S. Cl. ......................... 348/404; 348/412; 348/415

[58] Field of Search ..................................... 348/404, 403, 348/407, 413, 412, 411, 409, 415, 390, 384; 382/250, 248, 249, 239, 232; H04N 7/133

[56] References Cited

U.S. PATENT DOCUMENTS

| 5,196,930 | 3/1993 | Kadono et al. | 348/403 |
| 5,539,466 | 7/1996 | Igarashi et al. | 348/404 |
| 5,614,952 | 3/1997 | Boyce et al. | 348/404 |
| 5,673,358 | 9/1997 | Boyce | 386/112 |

*Primary Examiner*—Bryan Tung
*Attorney, Agent, or Firm*—Fitzpatrick, Cella, Harper & Scinto

[57] ABSTRACT

A coding apparatus and method having an orthogonal transforming unit which can execute orthogonal transformations of at least two kinds of transforming systems including frame units and field units for every block of inputted data, which selects the transforming system to be used based upon calculations which determine a field correlation within the block.

14 Claims, 17 Drawing Sheets

ONE DCT BLOCK (8 PIXELS PER BOTH HORIZONTAL AND VERTICAL DIRECTIONS = 64 PIXELS)

$S = |D_{1n}-D_{2n}|+|D_{3n}-D_{4n}|+|D_{5n}-D_{6n}|+|D_{7n}-D_{8n}|$

S : SUM OF ABSOLUTE VALUE OF INTERFIELD DIFFERENCE OF EACH ONE COLUMN IN VERTICAL DIRECTION $Sv = \sum_{n=1}^{8} S$ Sv : SUM OF Srow OF EACH ONE DCT BLOCK

ONE DCT BLOCK (8 PIXELS PER BOTH HORIZONTAL AND VERTICAL DIRECTIONS = 64 PIXELS)

Srow = $(D_{1n}-D_{2n})+(D_{3n}-D_{4n})+(D_{5n}-D_{6n})+(D_{7n}-D_{8n})$

Srow : SUM OF INTERFIELD DIFFERENCE FOR EACH ONE VERTICAL COLUMN

Sbl = $\sum_{n=1}^{8}$ |Srow|

Sbl : SUM OF |Srow| FOR EACH ONE DCT BLOCK

IMAGE CODING APPARATUS USING DETECTION OF FIELD CORRELATION

BACKGROUND OF THE INVENTION

1. Field of the Invention

The invention relates to a field correlation detection apparatus of a digital image signal and a coding apparatus using such a detection apparatus.

2. Related Background Art

Hitherto, an orthogonal transformation coding system is known as a technique for high efficiently compressing an image signal.

According to the orthogonal transformation coding system, an image signal is divided into blocks each consisting of a predetermined number of pixels, and after that, an orthogonal transformation such as a discrete cosine transformation (DCT) or the like is executed, and a quantization, an entropy coding, or the like is executed to coefficients after completion of the transformation.

As such a DCT, there are two kinds of DCTs: a frame DCT in which a block of pixels of [m (vertical direction)×n (horizontal direction)] (hereinafter, referred to as an image processing block) is converted in a lump as a frame image; and a field DCT in which a block of [m (vertical direction)×n (horizontal direction)] is divided into two fields and transformed every field, namely, independently, and after that, an addition and a difference of coefficients are obtained (refer to FIG. 1: n=m=8).

It is known that when the field DCT is applied to a block of a large motion, namely, low interfield correlation, high frequency components in the vertical direction which occur due to the motion are concentrated to a low frequency side, so that a coding efficiency is generally better and a distortion due to a quantization and an inverse quantization is smaller than those in the case where the frame DCT is applied.

FIG. 2 is an explanatory diagram showing the sum of the absolute values of interfield differences of one column in the vertical direction in an image processing block.

When the frame DCT processing and the field DCT processing are selected, hitherto, the total (refer to FIG. 2) for each one DCT block of the sum of the absolute values of interfield differences of one column in the vertical direction is compared with a certain threshold value for every DCT block. The block in which the sum is equal to or less than the threshold value is decided to be a block of a small motion, so that the DCT is switched to the frame DCT. The block in which the sum is larger than the threshold value is determined to be a block of a large motion, so that the DCT is switched to the field DCT.

According to the conventional discriminating method, however, in the case where there are correlations every two lines in data in the DCT block, for instance, in the case where the data in the image processing block is as shown in FIG. 3A, a large difference occurs when the correlation of the data such that the data in the block is deviated by one line (FIG. 3B) is compared with the correlation of the data of FIG. 3A.

Namely, although the correlation is strong in FIG. 3A, since the correlation is weak in FIG. 3B, the field DCT processing is executed in FIG. 3B.

In this case, two field DCT blocks have a highest frequency. When the DCT block as shown in FIG. 3B is processed by a discriminating method like a conventional method, coefficients in a high frequency area are raised, so that there is a possibility such that a coding efficiency deteriorates.

A problem also occurs in the conventional discriminating method even in case of the following image.

FIGS. 4 and 5 are graphs showing DCT blocks such that the sums of the absolute values of the interfield differences of one column in the vertical direction are almost equal. For the DCT blocks shown in the diagram, according to the foregoing conventional discriminating method shown in FIG. 2, since the sums of the absolute values of the interfield differences of one column in the vertical direction are the same, the same DCT (field, frame) processing is executed by the threshold value for both of the DCT blocks.

FIG. 4 shows an image pattern in the case where there is a motion in an edge in the horizontal direction existing in a flat picture. FIG. 6 is a graph showing the result obtained by processing the block of the image pattern of FIG. 4 by the frame DCT. FIG. 7 is a graph showing the result obtained by processing the block of the image pattern of FIG. 4 by the field DCT. In the diagrams, it will be understood that as for the DCT coefficients, if they are processed by the field DCT, it is advantageous for a distortion by the quantization and inverse quantization.

On the other hand, FIG. 5 shows a high fine image of a relatively low saturation. FIG. 8 is a graph showing the result obtained by processing the block of the image pattern of FIG. 5 by the frame DCT. FIG. 9 is a graph showing the result obtained by processing the block of the image pattern of FIG. 5 by the field DCT. In case of the DCT block of the picture as shown in FIG. 5, since there is no tendency such that the DCT coefficients are concentrated to the low frequency side by the field DCT processing, there is a case where the number of significant coefficients is larger than that in the case where the block is processed by the frame DCT. The distortion due to the quantization and inverse quantization is equal to or larger than that in the case where the block is processed by the frame DCT.

As mentioned above, according to the conventional discriminating method shown in FIG. 2, the DCT blocks as shown in FIGS. 4 and 5 cannot be distributed to the proper DCT process.

SUMMARY OF THE INVENTION

Under such circumstances, it is an object of the invention to provide a field correlation detecting apparatus and a coding apparatus in an apparatus for dividing an inputted image signal into blocks and orthogonal transforming every block and coding, wherein a transforming system (frame/field transformation) which can reduce coefficients in a high frequency area when the orthogonal transformation is performed can be certainly discriminated.

To accomplish the above object, according to one preferred embodiment, there is provided a field correlation detecting apparatus comprising: input means for inputting an image signal; block forming means for dividing the image signal into blocks of pixels; first operating means for arithmetically operating an absolute value of a difference between first field data and second field data of one column in the vertical direction of the block; first calculating means for calculating the maximum difference absolute value from the difference absolute values which were sequentially operated in the horizontal direction in the block; and discriminating means for discriminating a field correlation in accordance with the maximum difference absolute value in the block.

To accomplish the above object, according to another preferred embodiment, there is provided a coding apparatus comprising: input means for inputting an image signal;

block forming means for dividing the image signal into blocks of pixels; orthogonal transforming means which can execute orthogonal transformations of at least two kinds of transforming systems including frame units and field units every block; processing selecting means for selecting the transforming system of the orthogonal transforming means; and coding means for coding the image signal transformed by the transforming system selected by the selecting means, wherein the processing selecting means has first operating means for arithmetically operating an absolute value of a difference between first field data and second field data of one column in the vertical direction of the block, first calculating means for calculating the maximum difference absolute value from the difference absolute values which were sequentially operated in the horizontal direction in the block, and selecting means for selecting the transforming system in accordance with the maximum difference absolute value in the block.

Other objects, features and advantages of the invention will become apparent from the following detailed description taken in conjunction with the accompanying drawings.

DETAILED DESCRIPTION OF THE PREFERRED EMBODIMENTS

Figure 1:
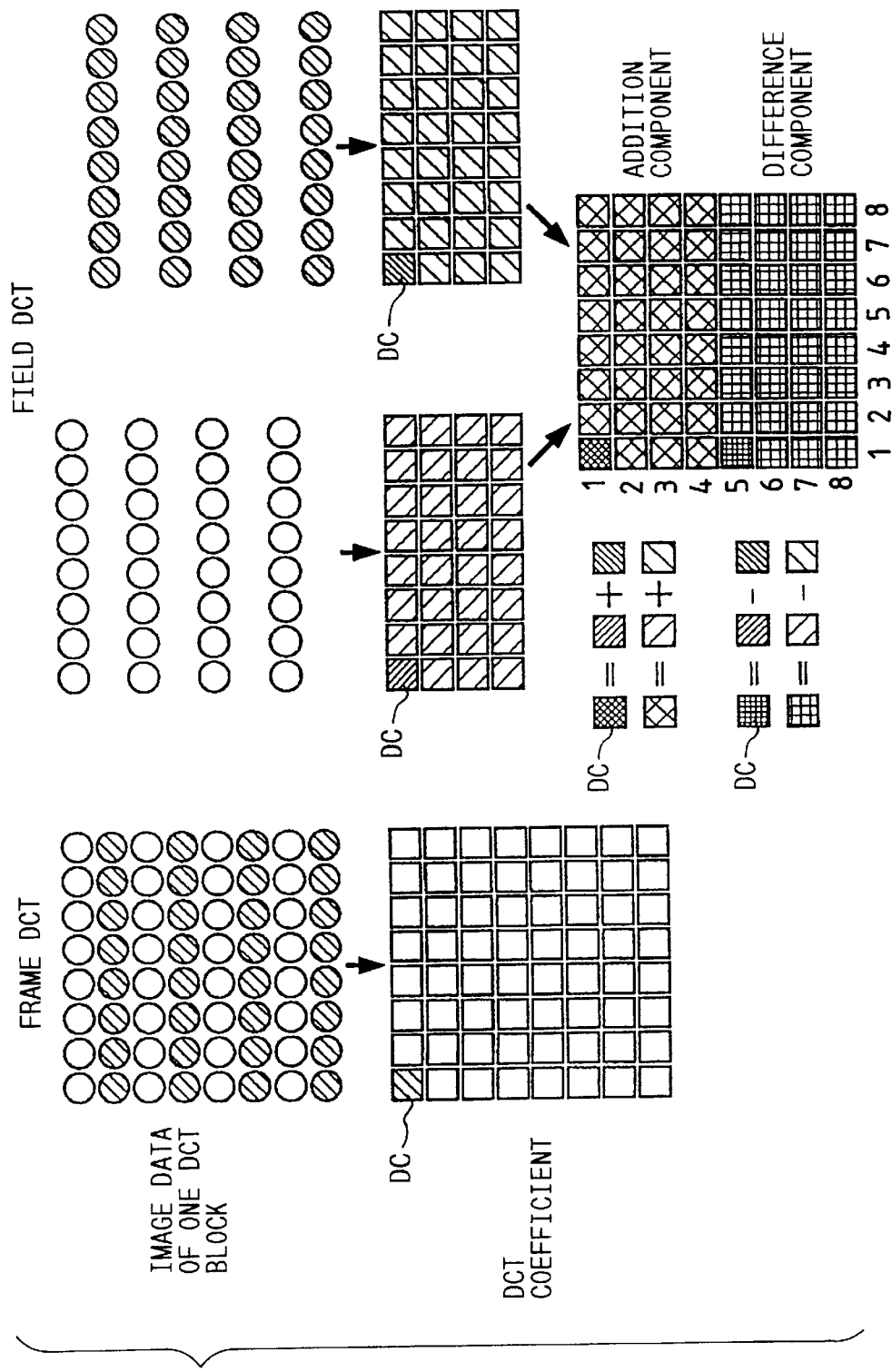
FIG. 1 is an explanatory diagram showing processings of a frame DCT and a field DCT.
Figure 2:
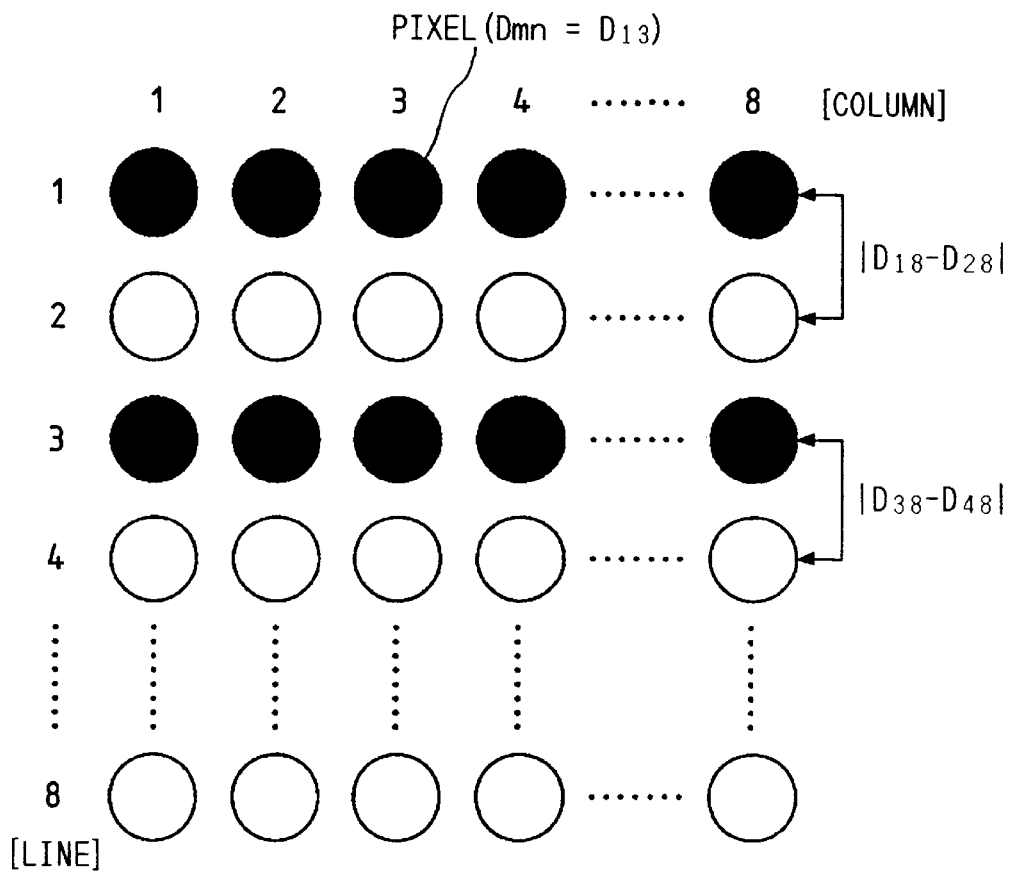
FIG. 2 is an explanatory diagram showing the sum of absolute values of interfield differences of one column in the vertical direction in an image processing block.
Figure 3A:
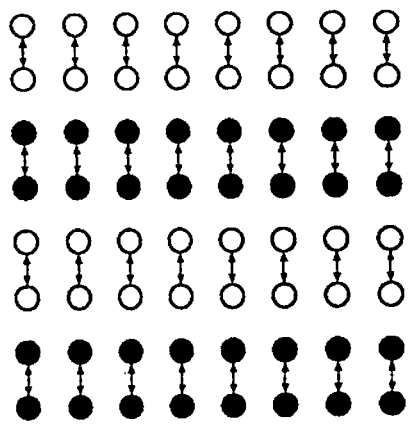
FIGS. 3A and 3B are diagrams showing examples in which there are correlations every two lines in data in the image processing block.
Figure 3B:
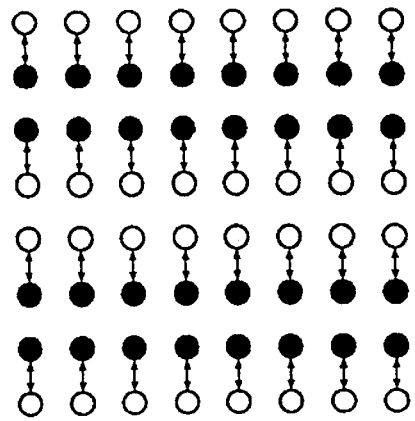
Figure 4:
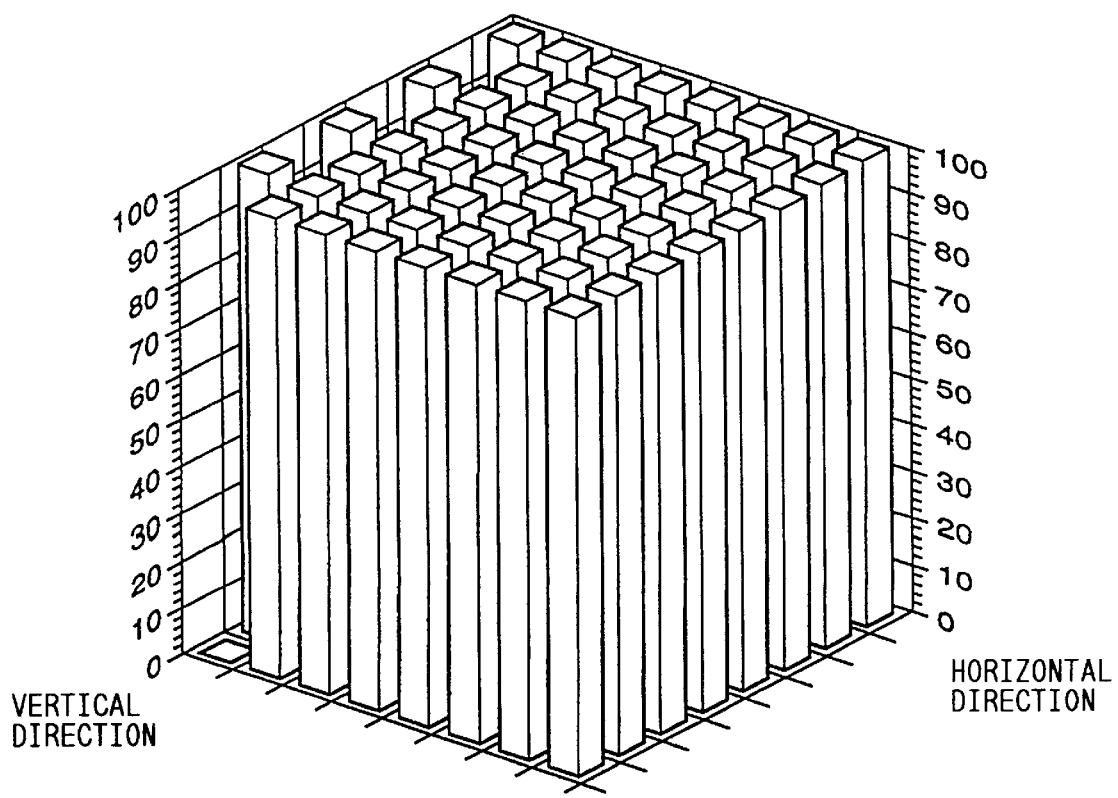
FIG. 4 is a graph showing a DCT block in which the sum of the absolute values of the interfield differences of one column in the vertical direction is almost equal to that in FIG. 5.
Figure 5:
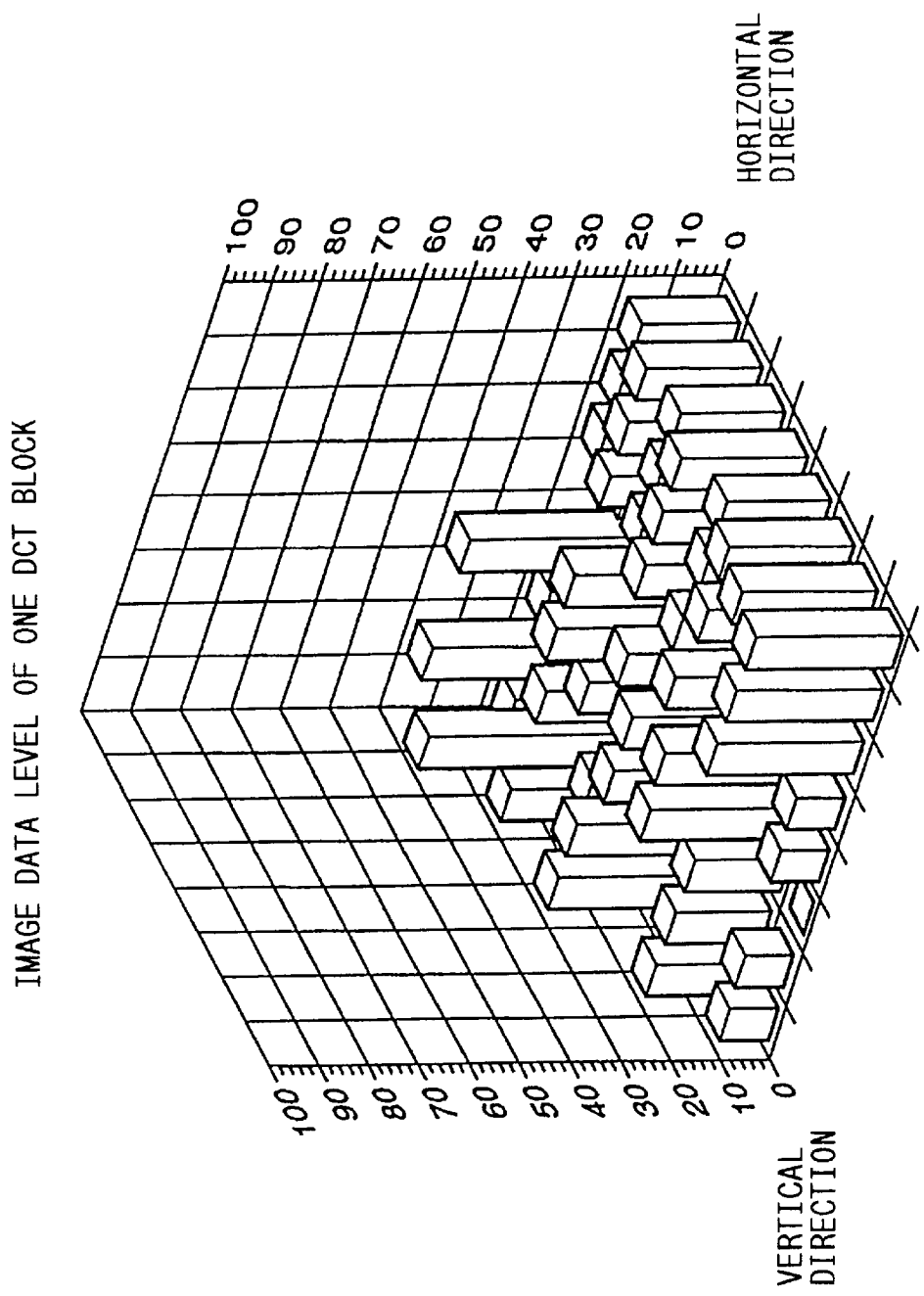
FIG. 5 is a graph showing a DCT block in which the sum of the absolute values of the interfield differences of one column in the vertical direction is almost equal to that in FIG. 4.
Figure 6:
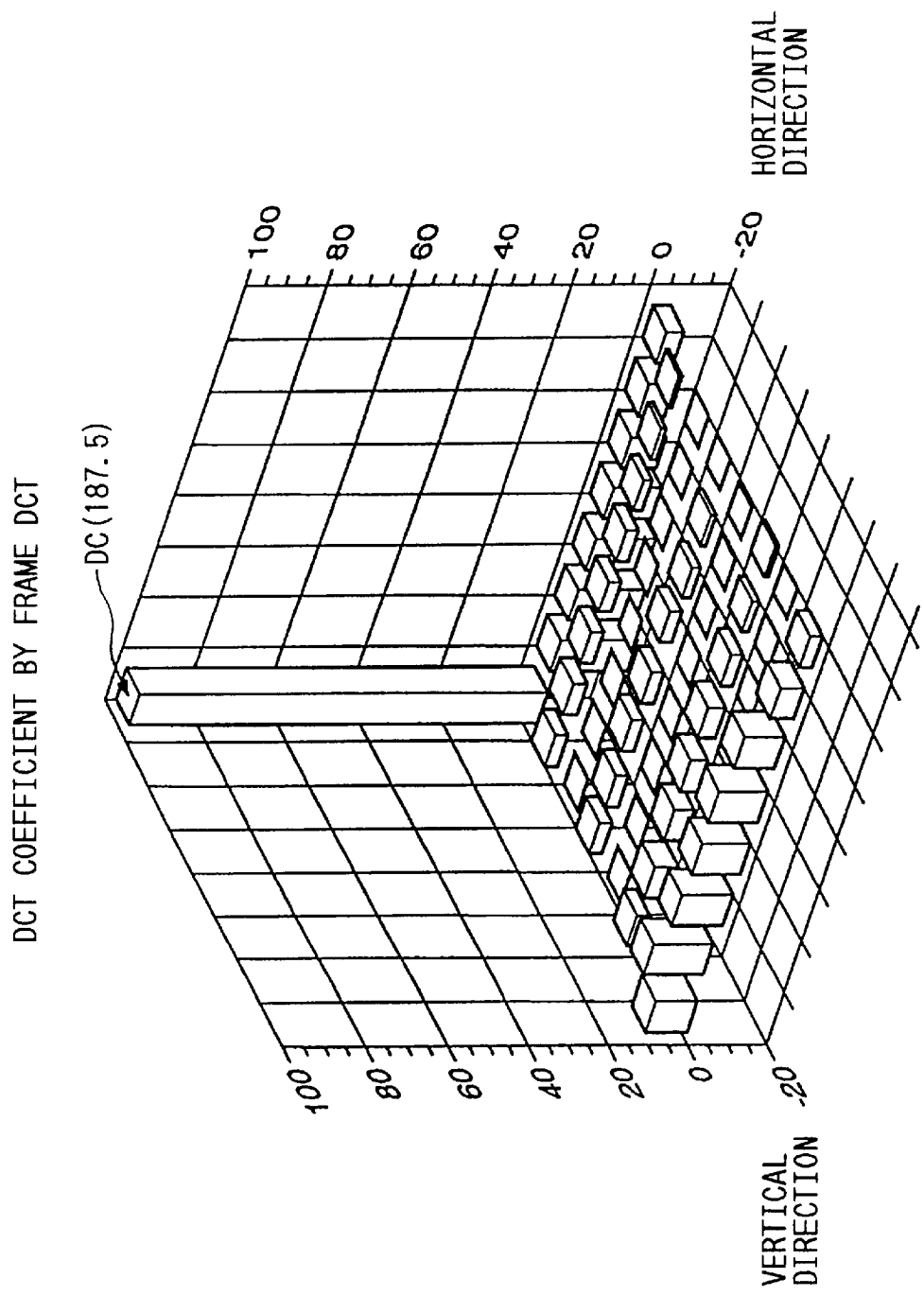
FIG. 6 is a graph showing the result obtained by processing a block of an image pattern of FIG. 4 by a frame DCT.
Figure 7:
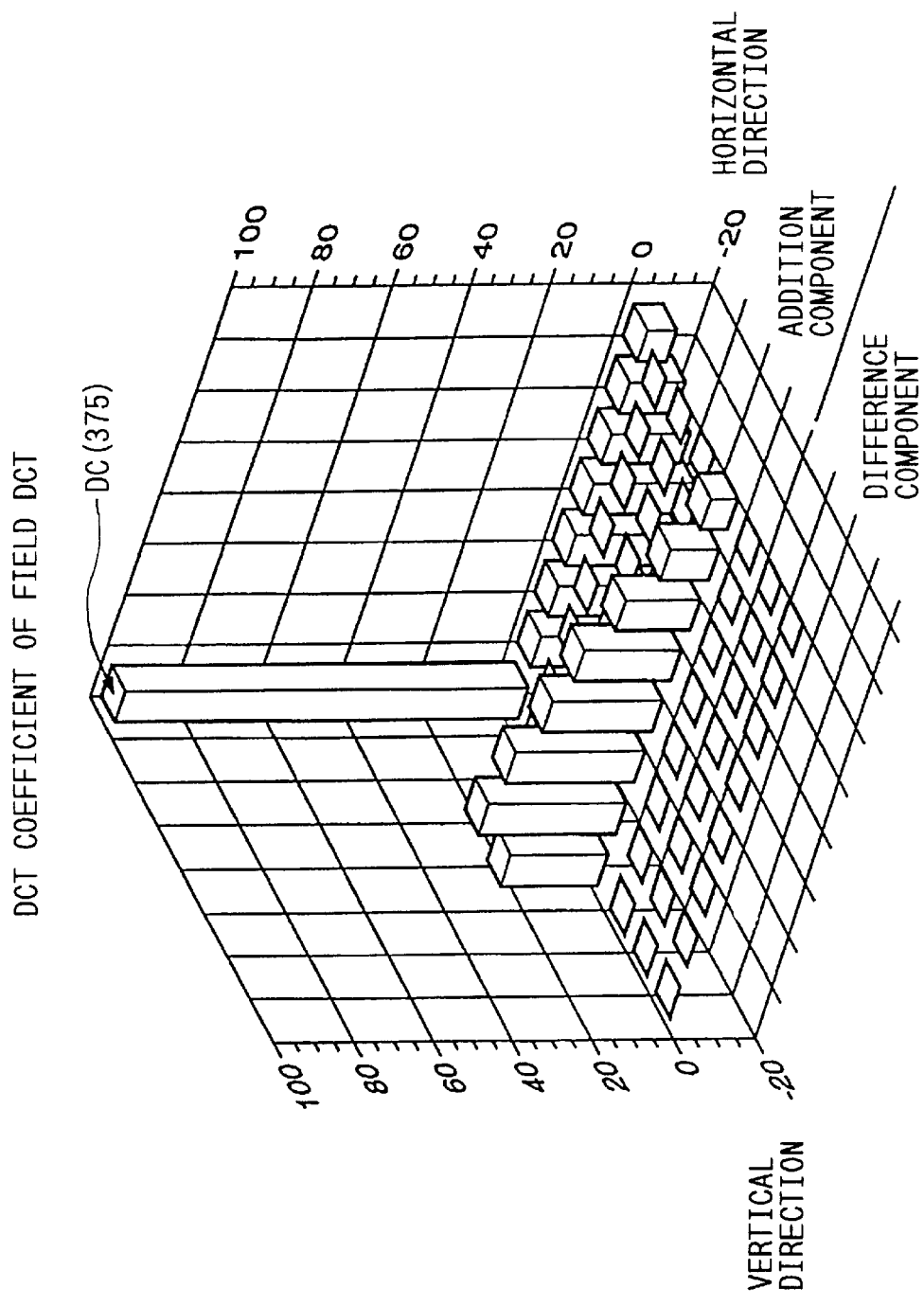
FIG. 7 is a graph showing the result obtained by processing the block of the image pattern of FIG. 4 by a field DCT.
Figure 8:
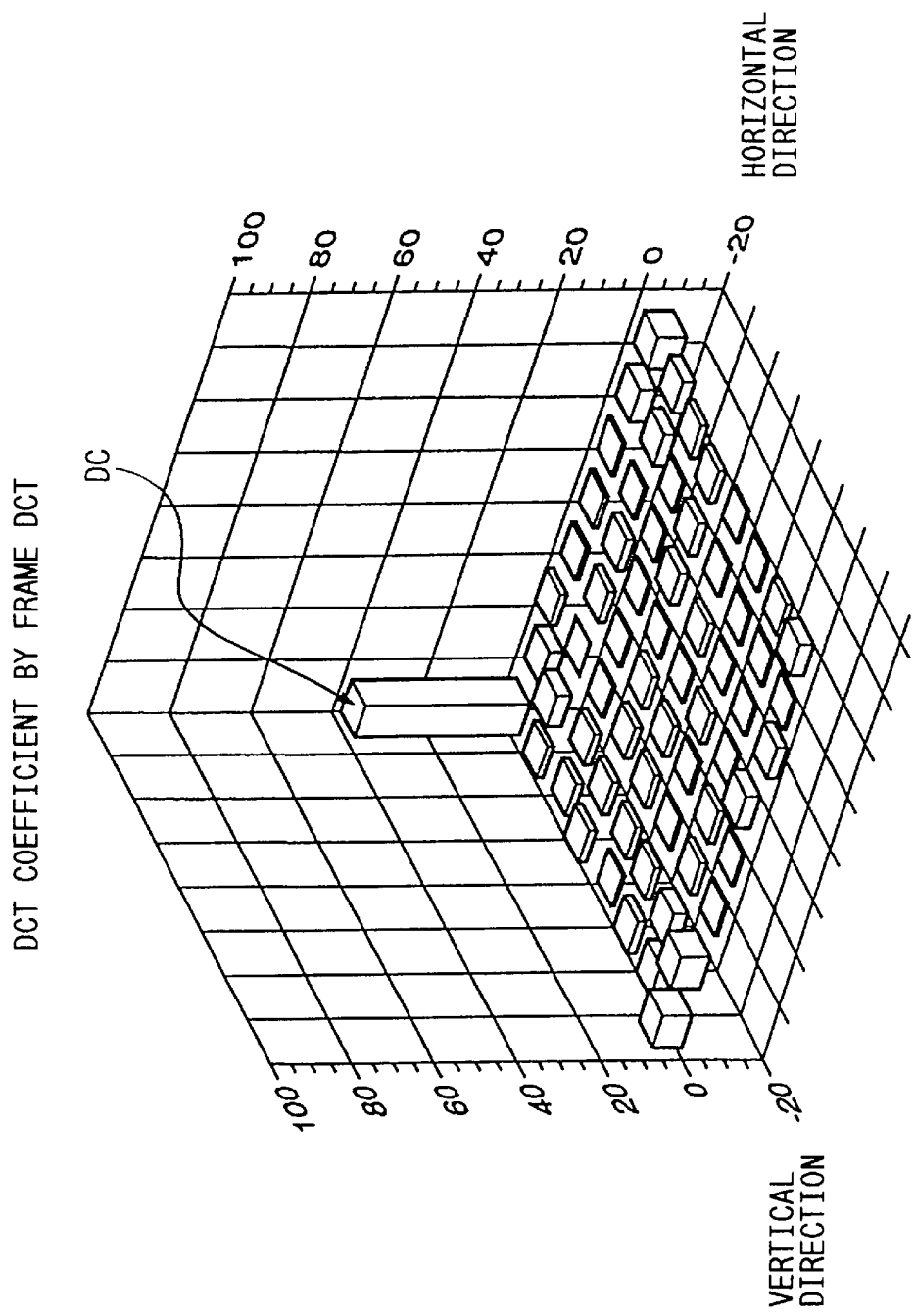
FIG. 8 is a graph showing the result obtained by processing a block of the image pattern of FIG. 5 by the frame DCT.
Figure 9:
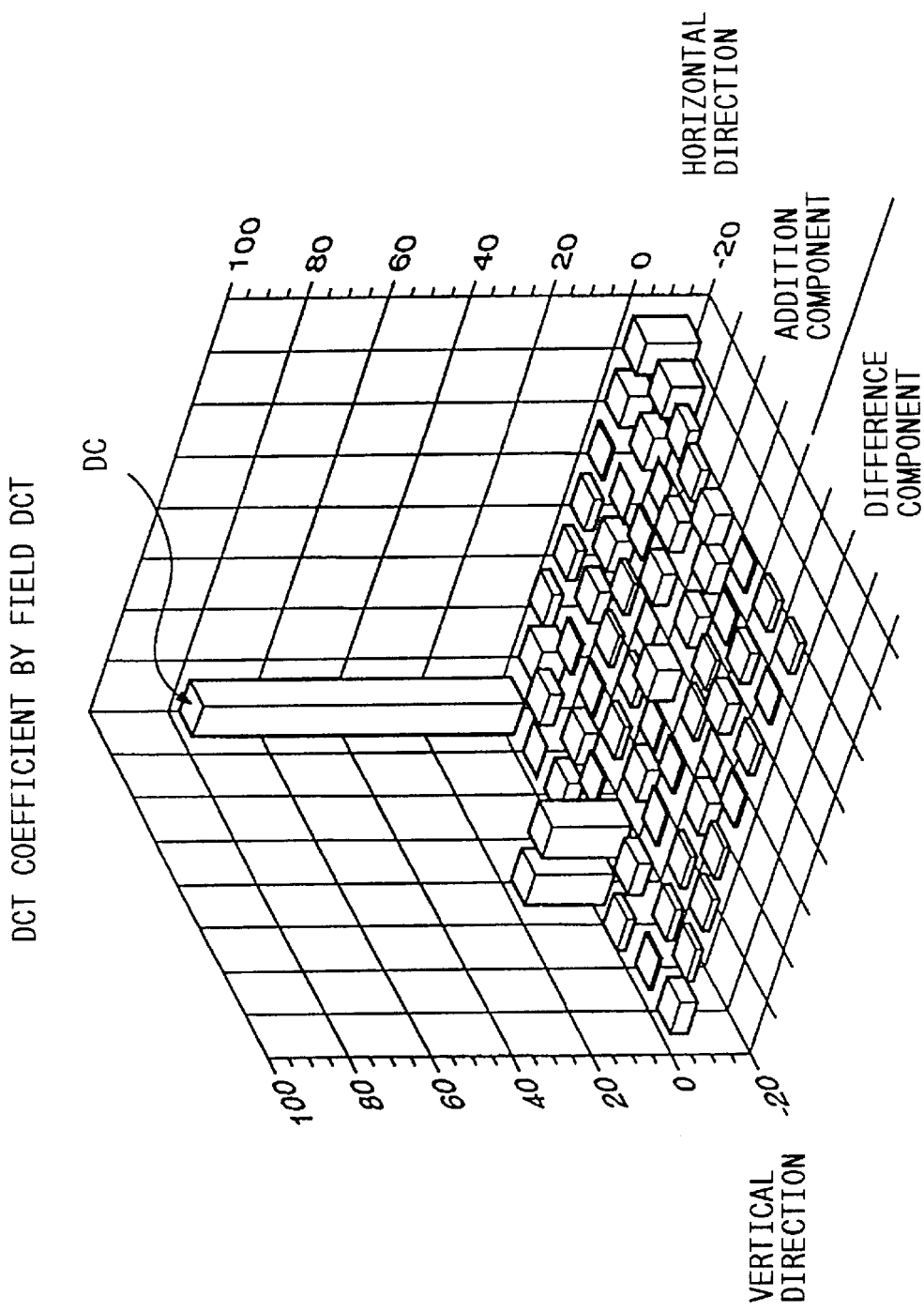
FIG. 9 is a graph showing the result obtained by processing the block of the image pattern of FIG. 5 by the field DCT.
Figure 10:
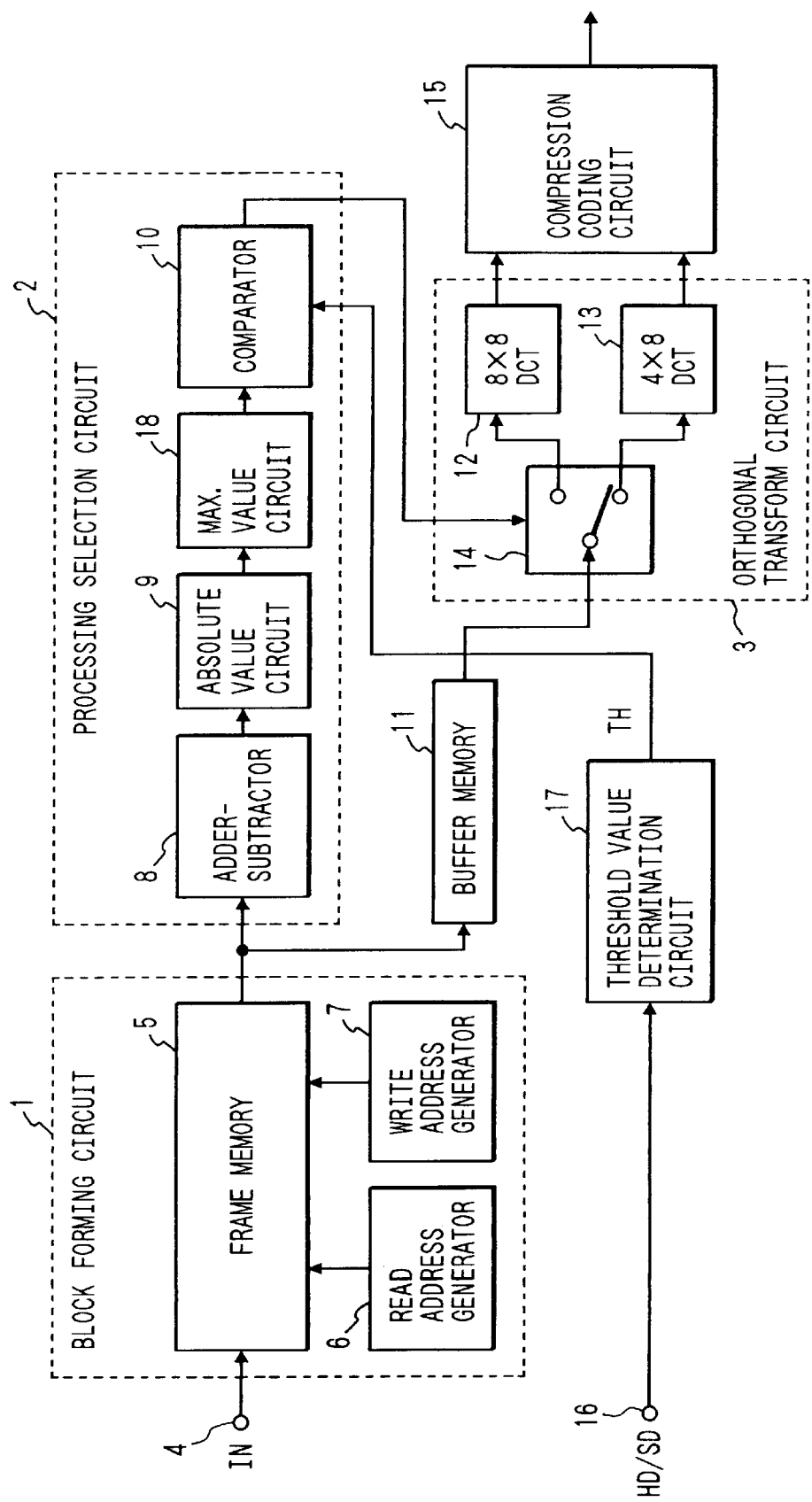
FIG. 10 is a block diagram showing a construction of a coding apparatus of the first embodiment according to the invention.

FIG. 10 is a block diagram showing a construction of a coding apparatus of the first embodiment according to the invention.

In FIG. 10, image data which is inputted on a field unit basis from an input terminal 4 is written into a frame memory 5 in accordance with an address which is generated from a write address generator 7. The image data written in the frame memory 5 is read out from the frame memory 5 on the basis of an address which is generated from a read address generator 6 so as to be read out on a block unit basis of (8×8) pixels. In this instance, the read address generator 6 generates the addresses so that the data in the block is sequentially read out in accordance with the pixel numbers, namely, in the vertical direction.

The block data of the unit of (8×8) pixels which was outputted from a block forming circuit 1 is inputted to a processing selection circuit 2. An absolute value of a field difference of pixels 1 to 8, an absolute value of a field difference of pixels 9 to 18, ..., and an absolute value of a field difference of pixels 57 to 64 are calculated by an adder-subtractor 8 and an absolute value circuit 9.

When eight kinds of absolute values for each block are continuously outputted from the absolute value circuit 9, a maximum value circuit 18 detects the maximum value of the eight kinds of absolute values in the block. A comparator 10 compares an output of the maximum value circuit 18 and a threshold value TH that is outputted from a threshold value determination circuit 17 and outputs comparison information between the maximum absolute value and the threshold value TH.

The image data read out from the frame memory 5 is inputted to a buffer memory 11 and is delayed so that an output timing of the comparison information which is outputted by the processing selection circuit 2 and an output timing of two kinds of orthogonal transformation output in an orthogonal transform circuit 3 coincide.

Data which is outputted from the buffer memory 11 is inputted to the orthogonal transform circuit 3. A selector 14 selects one of two kinds of DCT processings by the comparison information which is outputted from the processing selection circuit 2. The orthogonal transform circuit 3 has: a DCT circuit 12 of (8×8) for performing an orthogonal transformation irrespective of field data in the block; and a DCT circuit 13 of (4×8) for performing an orthogonal transformation to each of the first/second fields in the block on a field unit basis. Either one of the DCT processings is executed by the comparison information.

DCT coefficient data which is outputted from the orthogonal transform circuit 3 is inputted to a compression coding circuit 15.

The compression coding circuit 15 quantizes inputted DCT coefficients and performs an entropy coding and supplies the resultant data to a recorder (not shown).

Format information (TV broadcasting system information) such as SD (standard definition)/HD (high definition)/other system or the like is inputted from a format terminal 16. The threshold value TH suitable for each format is outputted from the threshold value determination circuit 17 to the comparator 10.

Figure 11:
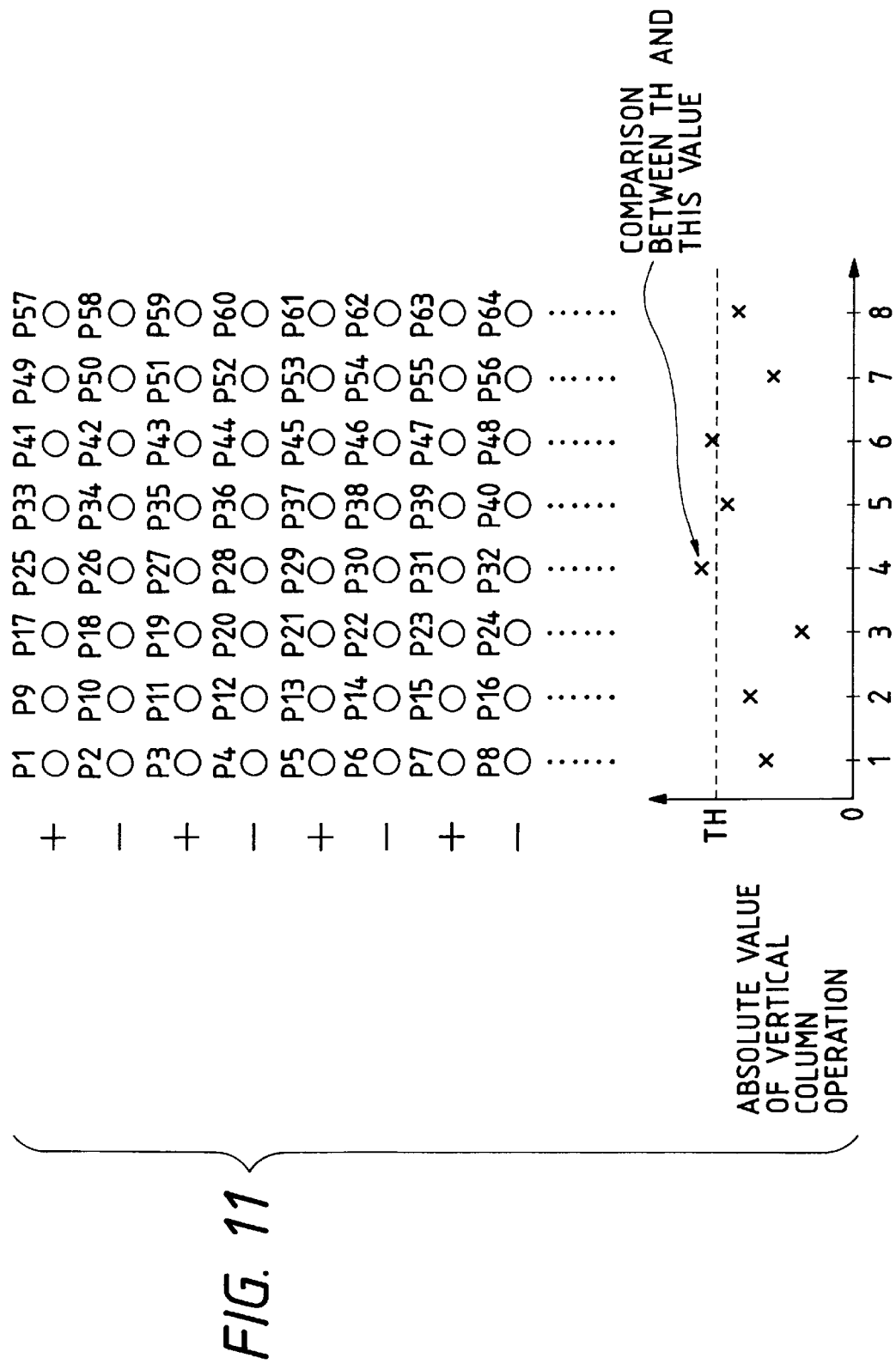
FIG. 11 is an explanatory diagram showing a processing of image data in an image processing block of the first embodiment.

FIG. 11 is an explanatory diagram showing a processing of the image data in the image processing block of the first embodiment.

In FIG. 11, now assuming that the image data in the image processing block (64 pixels) are set to pixels P1, P2, ..., P64, ABS (P1−P2+P3−P4+P5−P6+P7−P8), ..., ABS (P57−P58+P59−P60+P61−P62+P63−P64) are calculated. ABS denotes an absolute value.

This means that the correlation of one column in the vertical direction is calculated in the block. As the absolute value is large, the correlation is small, a motion exists in the block, and a frequency component in the vertical direction due to the motion is large. When the orthogonal transformation is executed to the block in which the motion exists as mentioned above, by executing the DCT processing of the field (4×8) in the field, the DCT coefficients can be concentrated to a low frequency area and it is preferable from a viewpoint of a coding efficiency.

Figure 12:
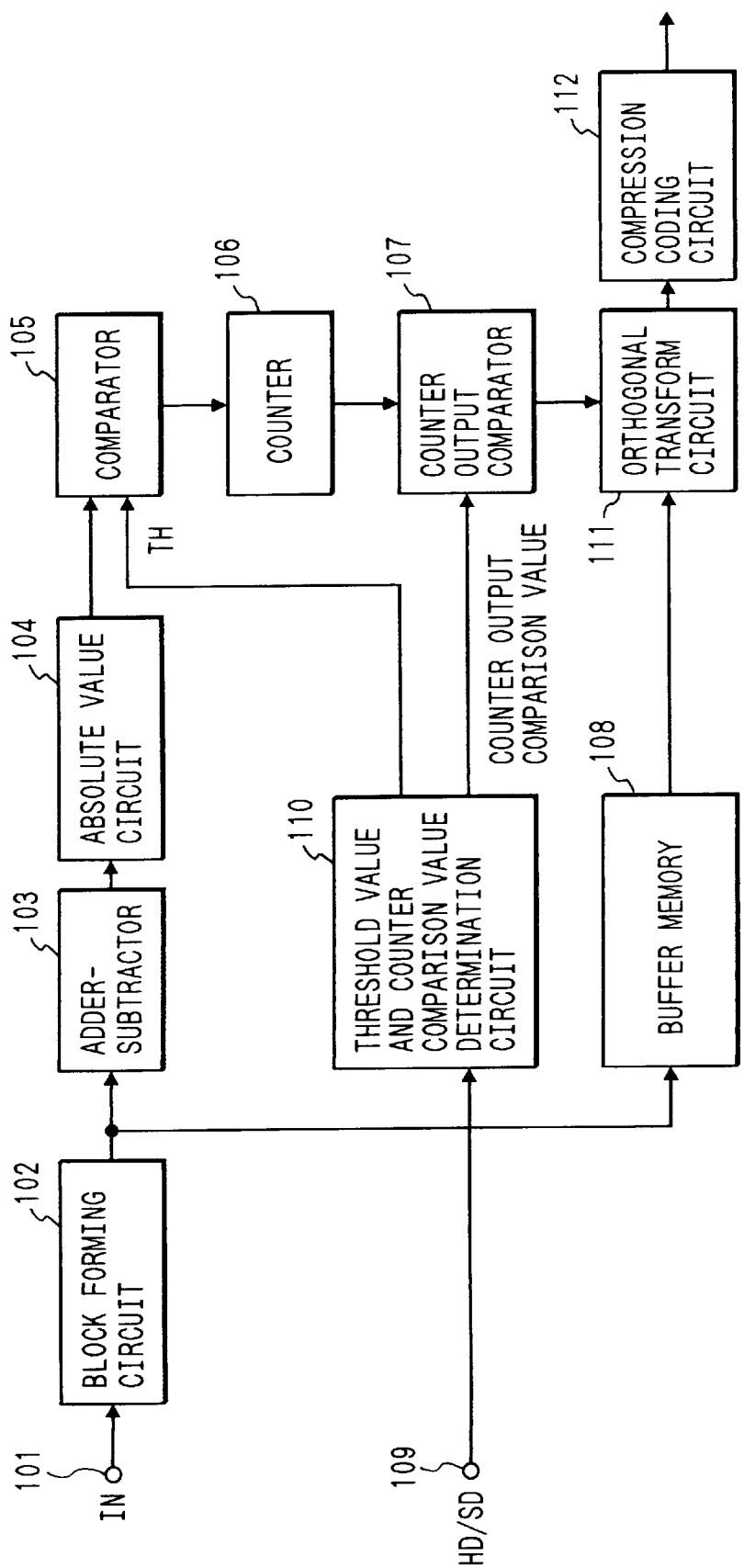
FIG. 12 is a block diagram showing a construction of a coding apparatus of the second embodiment according to the invention.

FIG. 12 is a block diagram showing a construction of a coding apparatus of the second embodiment according to the invention.

In FIG. 12, image data of a field unit which is inputted from a data input terminal 101 is supplied to a block forming circuit 102 including a frame memory in a manner similar to the foregoing first embodiment.

The block forming circuit 102 generates data of a block unit which was divided into frames and constructed by (8×8) pixels. When the output data of the block forming circuit 102 is inputted to an adder-subtractor 103, a correlation of eight pixels in the vertical direction is calculated by the adder-subtractor 103. The absolute value of each correlation of eight columns in the horizontal direction is calculated by an absolute value circuit 104. An output of the absolute value circuit 104 is inputted to a comparator 105 and is compared with the threshold value TH which is generated from a threshold value and counter comparison value determination circuit 110.

An output of the comparator 105 is eight data in the block. A counter 106 counts the number of columns in the block in which the output of the absolute value circuit 104 is larger than the threshold value TH. A count output of the counter 106 is inputted to a counter output comparator 107 and is compared with a counter output comparison value which is generated from the threshold value and counter comparison value determination circuit 110. The counter output comparator 107 outputs the comparison result to an orthogonal transform circuit 111.

The image data outputted from the block forming circuit 102 is inputted to a buffer memory 108. An output timing is adjusted in the buffer memory 108 in a manner similar-to the first embodiment. The resultant data is supplied to the orthogonal transform circuit 111. The orthogonal transform circuit 111 executes a processing of a frame orthogonal transformation or a field orthogonal transformation. Either one of the two kinds of orthogonal transforming systems is selected by an output of the counter output comparator 107. When the output of the counter 106 is larger than the counter output comparison value, the field orthogonal transformation is selected. An output of the orthogonal transform circuit 111 is inputted to a compression coding circuit 112 and compression coded and the coded data is outputted to the recorder (not shown).

The threshold value TH and counter output comparison value are determined by the threshold value and counter comparison value determination circuit 110 as proper numerical values according to format information (TV broadcasting system information) which is inputted from a format selecting terminal 109.

Figure 13:
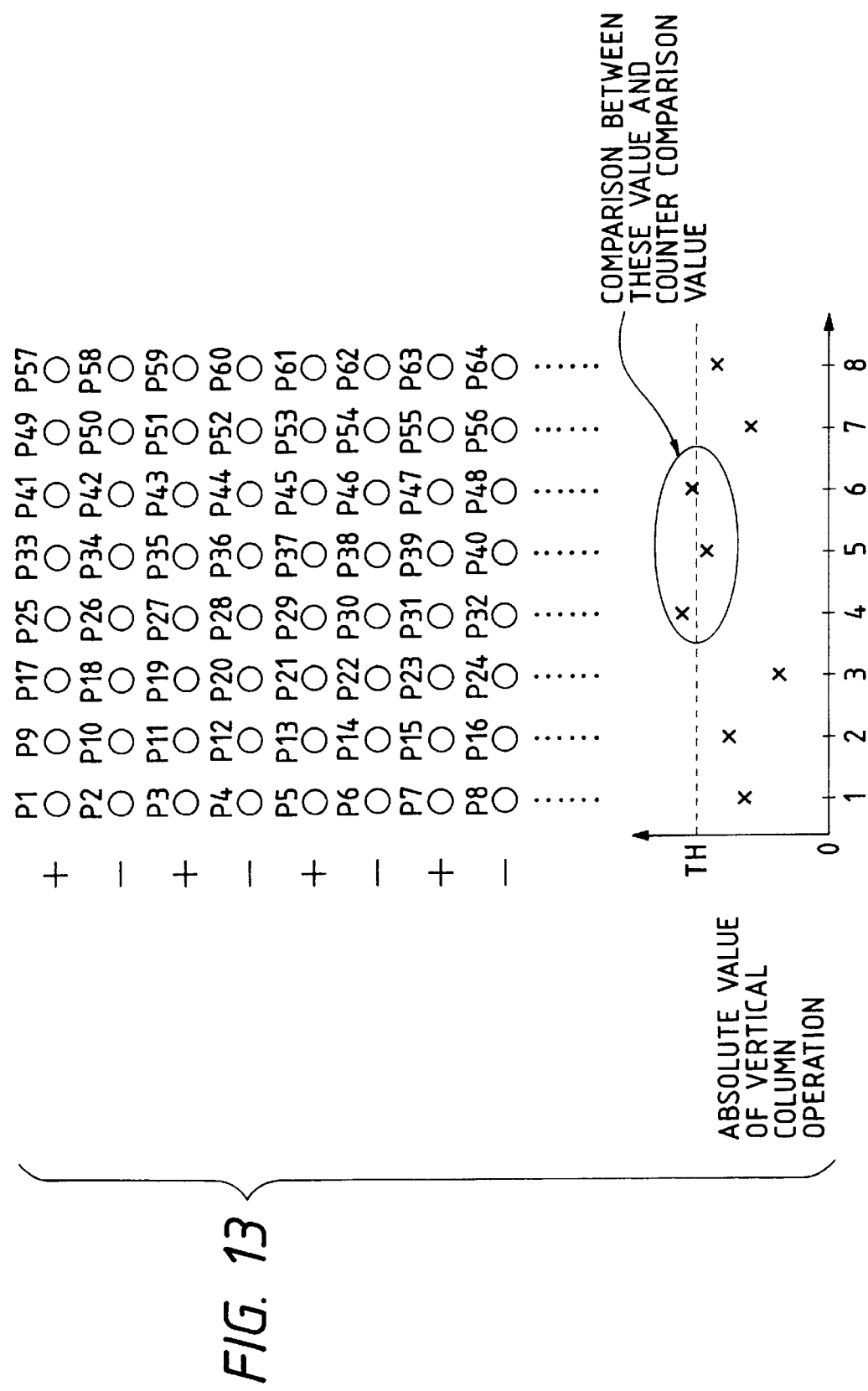
FIG. 13 is an explanatory diagram showing a processing of image data in an image processing block of the second embodiment.

FIG. 13 is an explanatory diagram showing a processing of the image data in the image processing block of the second embodiment.

The image data is sequentially outputted from the block forming circuit 102 in accordance with the order of the pixel numbers. In a manner similar to the first embodiment, with respect to the block data, the correlation of the pixels 1 to 8 is first calculated as ABS (P1−P2+P3−P4+P5−P6+P7−P8).

As for the other columns in the vertical direction, the correlations (the correlation is strong when it is near 0) are also likewise calculated. The eight kinds of correlations obtained are compared with the threshold value TH. The number of columns (columns of weak correlations) in which the correlation is larger than the threshold value TH is counted by the counter 106.

The output value of the counter 106 is compared with the counter output comparison value. When the output value is larger than the counter output comparison value, a target block is decided to be a block in which the number of columns of weak correlations is large, so that the field orthogonal transformation is selected. In the other cases, the frame orthogonal transformation is selected.

According to the coding apparatus of the second embodiment, since the number of columns of the weak correlations is counted, the threshold value TH can be set to a value smaller than that in the first embodiment in which the weak correlation is detected by the weakest correlation value in the block. Therefore, even in a block of a low contrast such that the transforming system of the image data in the block is not determined to be the field orthogonal transformation in case of the threshold value TH in the first embodiment, a block in which the columns of weak correlations in the vertical direction in the block exists can be discriminated.

Figure 14:
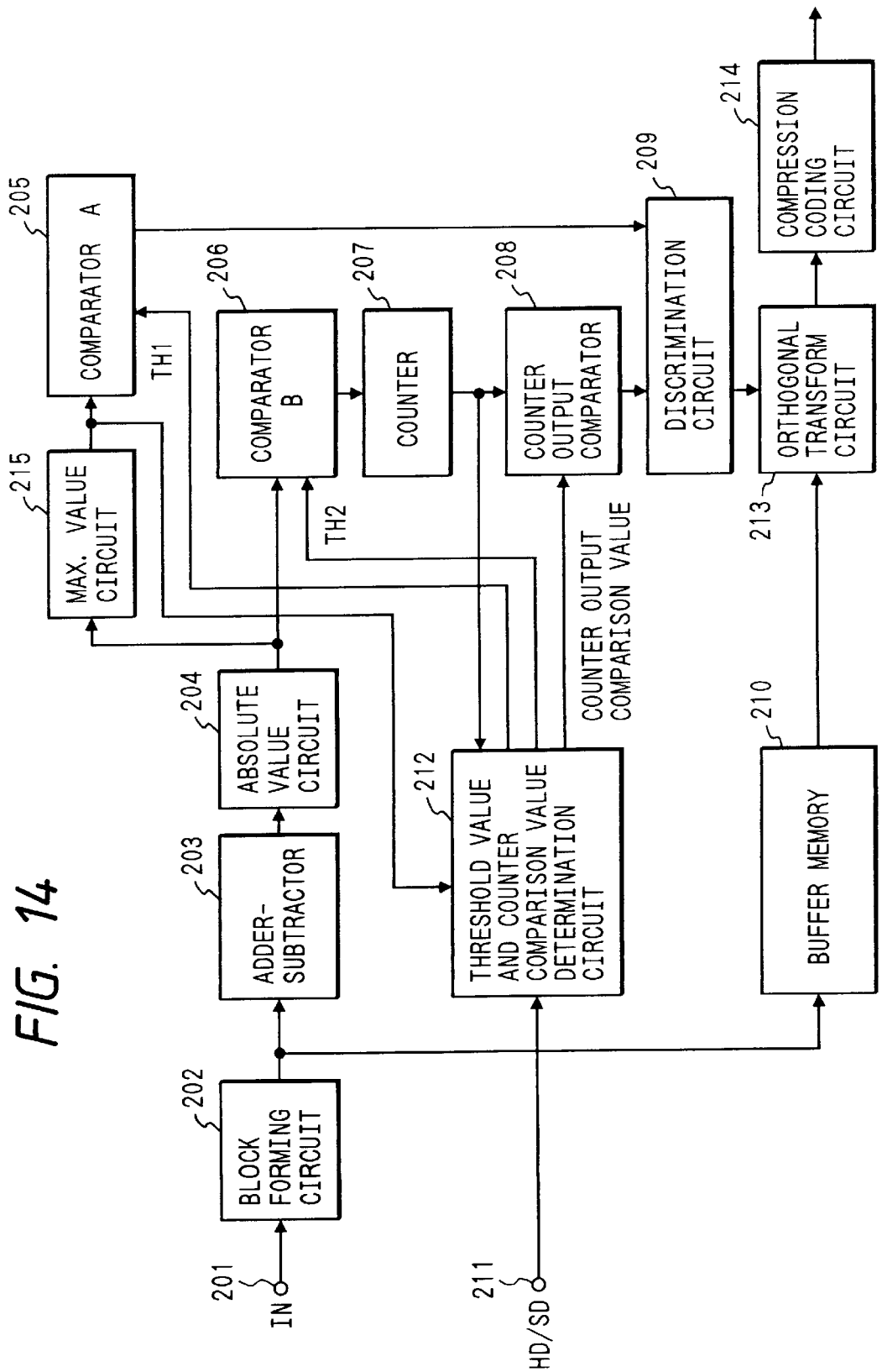
FIG. 14 is a block diagram showing a construction of a coding apparatus of the third embodiment according to the invention.

FIG. 14 is a block diagram showing a construction of a coding apparatus of the third embodiment according to the invention.

In FIG. 14, with respect to the data inputted from a data input terminal 201, the correlation in the vertical direction in the block is calculated by a block forming circuit 202, an adder-subtractor 203, and an absolute value circuit 204 in a manner similar to the first and second embodiments mentioned above.

As a correlation in the vertical direction in the block, the maximum correlation in the vertical direction in the block is obtained by a maximum value circuit 215, a comparator A 205, and a threshold value TH1 in a manner similar to the first embodiment.

The number of columns of weak correlations in the vertical direction in the block is obtained by a comparator B 206, a counter 207, a counter output comparator 208, a threshold value TH2, and a counter output comparison value in a manner similar to the second embodiment.

An output of the comparator A 205 and an output of the counter output comparator 208 are inputted to a discrimination circuit 209. Selection discrimination information of the field orthogonal transformation or frame orthogonal transformation is outputted from the discrimination circuit 209.

With respect to the image data whose output timing was adjusted by the buffer memory 210, two kinds of processings, namely, the processing of the frame orthogonal transformation and the processing of the field orthogonal transformation are executed by an orthogonal transform circuit 213. One of the orthogonal transform coefficient data is selected by the OR of the selection discrimination information which is outputted from the discrimination circuit 209, for example, an output of the comparator A 205 and an output of the counter output comparator 208. The orthogonal transform coefficients outputted from the orthogonal transform circuit 213 are supplied to a compression coding circuit 214 and are compression coded and are outputted to the recorder (not shown).

According to the coding apparatus of the third embodiment, the block in which the columns of weak correlations in the vertical direction exist can be efficiently detected irrespective of the contrast.

By feeding back the output of the maximum value circuit 215 or the output of the counter 207 to a threshold value and counter comparison value determination circuit 212, the threshold value according to the maximum correlation in the vertical direction in the block and the number of columns of weak correlations in the vertical direction can be also decided. For example, a decrease in threshold value TH2 or the like for an increase in output of the maximum value circuit 215 can be also determined.

Figure 15:
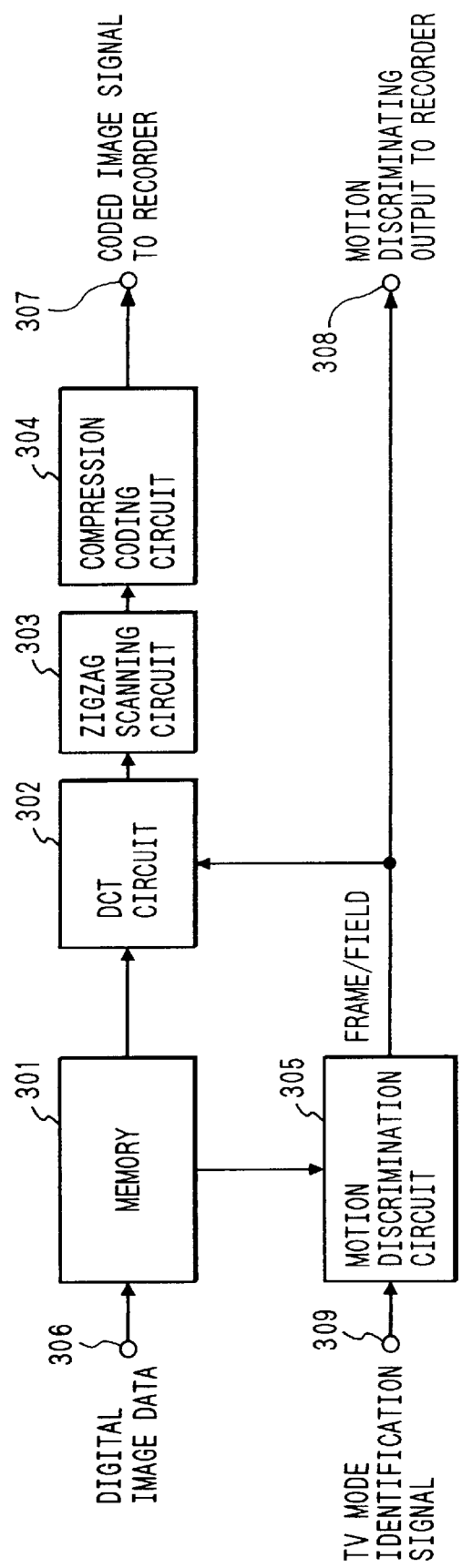
FIG. 15 is a block diagram showing a construction of a coding apparatus of the fourth embodiment according to the invention.

FIG. 15 is a block diagram showing a construction of a coding apparatus of the fourth embodiment according to the invention.

In FIG. 15, reference numeral 301 denotes a memory which can be read out in accordance with the order corresponding to the frame DCT and field DCT; 302 a DCT circuit to perform a frame DCT processing and a field DCT processing in accordance with a motion discrimination signal; 303 a zigzag scanning circuit for permutating the DCT coefficients to the order of the zigzag scan; 304 a compression coding circuit corresponding to a media; 305 a motion discrimination circuit for discriminating a motion amount of an image every block and outputting a motion discrimination signal; 306 an input terminal of a digital image signal; 307 an output terminal of the digital image signal which was compression coded; 308 an output terminal to supply the motion discrimination signal outputted from the motion discrimination circuit 305 to the outside, for example, a recording circuit or the like; and 309 an input terminal of a TV mode identification signal to identify HD, SD, ED, or the like.

Figure 16:
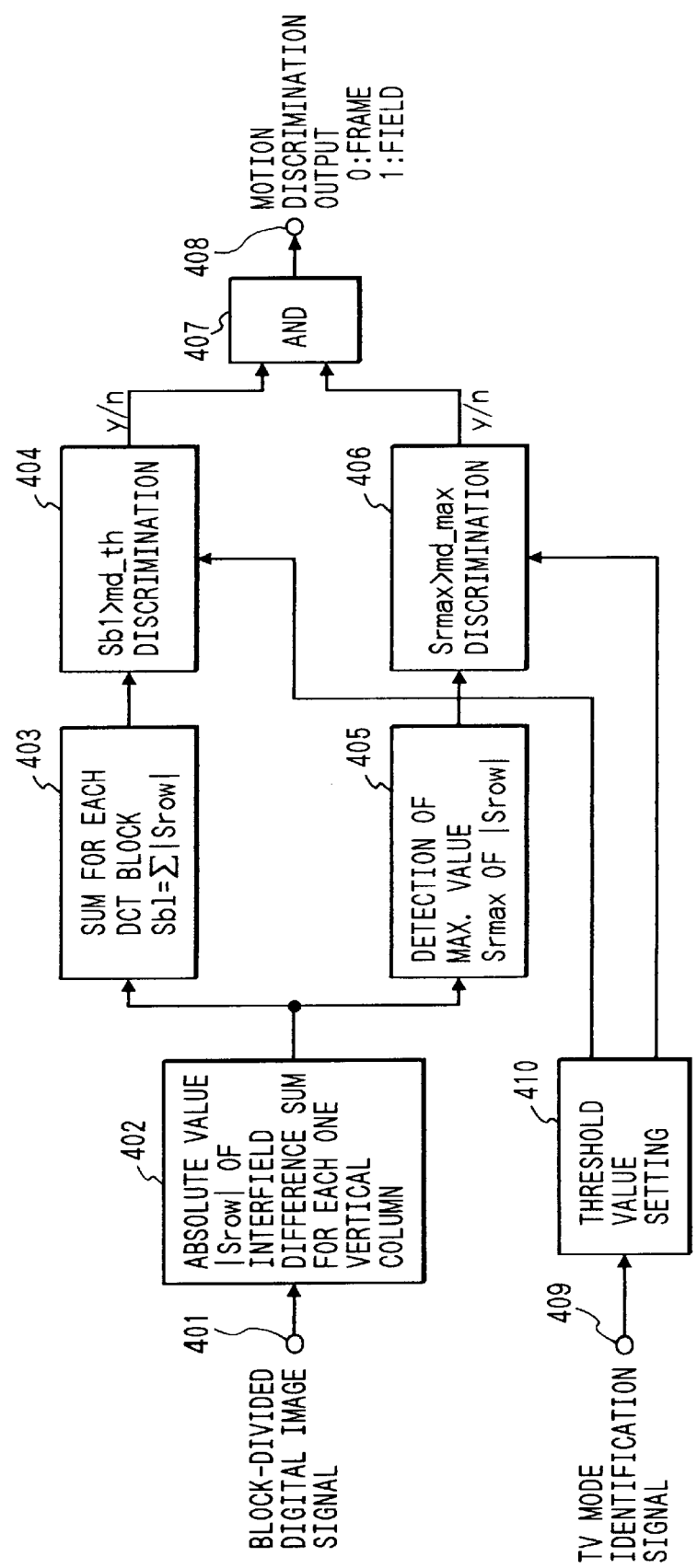
FIG. 16 a block diagram showing an internal construction of a motion discrimination circuit 305 in FIG. 15.

FIG. 16 is a block diagram showing an internal construction of the motion discrimination circuit 305.

Figure 17:
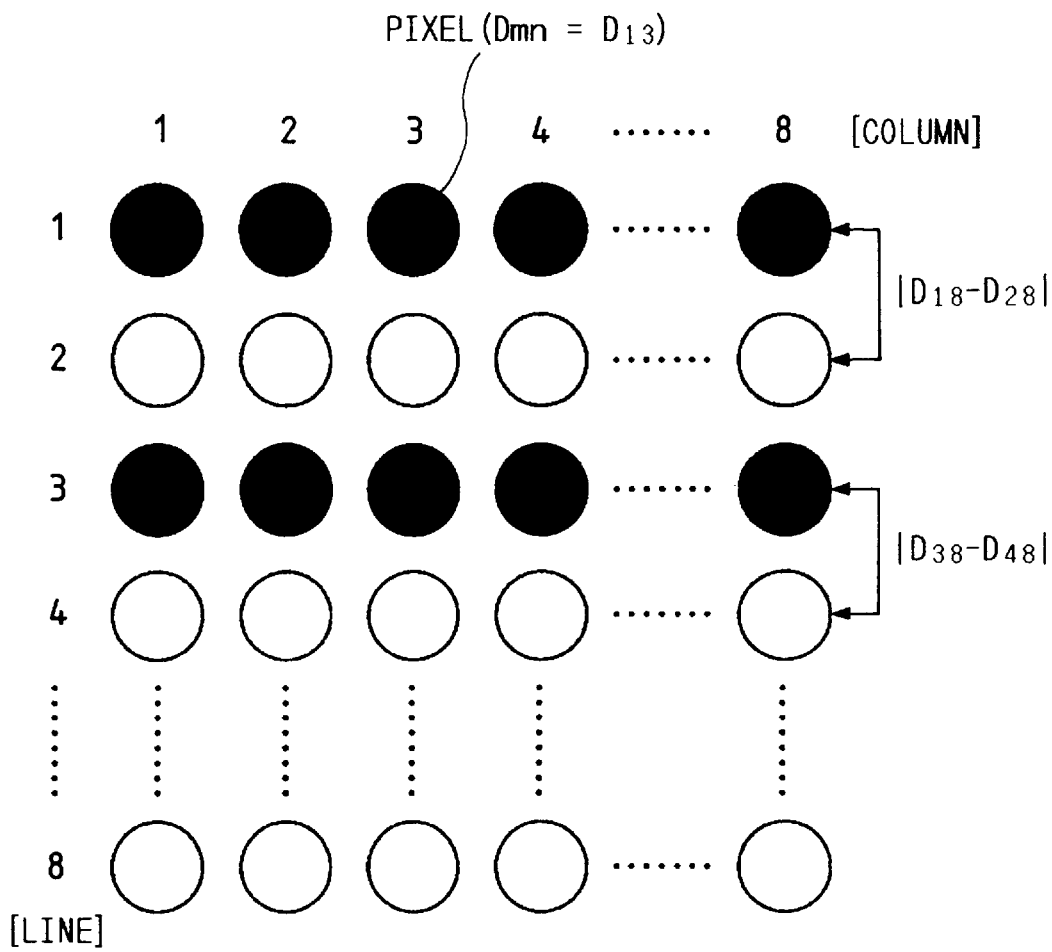
FIG. 17 is an explanatory diagram showing the sum of the absolute values of interfield differences of one column in the vertical direction in an image processing block.

In FIG. 16, reference numeral 401 denotes an input terminal of a digital image signal (block unit); 402 a circuit for calculating an absolute value |Srow| (refer to FIG. 17) of the sum of the interfield differences of each one column of a DCT block; 403 a circuit to calculate a sum Sb1 in the block of |Srow|; and 404 a discrimination circuit for comparing the sum Sb1 outputted from the circuit 403 with a threshold value md_th, thereby discriminating Sb1>md_th. An output of the discrimination circuit is inputted to an AND circuit 407.

Reference numeral 405 denotes a detection circuit for detecting a maximum value Srmax in the block of |Srow|. Reference numeral 406 a discrimination circuit for comparing the maximum value Srmax of the absolute values of the sum of the interfield differences of one column in the vertical direction outputted from the detection circuit 405 with a threshold value md_max, thereby discriminating Srmax>md_max. An output of the discrimination circuit 406 is inputted to the AND circuit 407. The AND circuit 407 calculates the AND between the discrimination result of the discrimination circuit 404 and the discrimination result of the discrimination circuit 406 and outputs as a motion discrimination signal.

Reference numeral 408 denotes an output terminal of the motion discrimination signal which is outputted from the AND circuit 407. Reference numeral 409 indicates an input terminal of the TV mode identification signal which is common to the terminal 309 in FIG. 15. The input terminal 409 is connected to the discrimination circuits 404 and 406. Reference numeral 410 denotes a threshold value setting circuit which can set the threshold value md_th of the discrimination circuit 404 to an arbitrary value every TV mode by inputting the TV mode identification signal inputted from the input terminal 409.

The processing operation of the coding apparatus constructed as mentioned above will now be described.

A digital image signal stored in the memory 301 is read out on a block unit basis and inputted to the motion discrimination circuit 305 and DCT circuit 302.

For the digital image signal (block unit) inputted from the memory 301 through the input terminal 401, in the motion discrimination circuit 305, the circuit 402 calculates the absolute value |srow| of the sum of the interfield differences of each column, the circuit 403 obtains the sum Sb1 of |Srow|, and the circuit 404 discriminates that Sb1>md_th. When it is true, the circuit 404 outputs "1" to the AND circuit 407. When it is false, "0" is outputted to the AND circuit 407.

The circuit 405 detects the maximum value Srmax of |Srow| of each column. The circuit 406 compares the maximum value Srmax with the threshold value md_max, thereby discriminating whether Srmax>md_max or not. When it is true, the circuit 406 outputs "1" to the AND circuit 407. When it is false, "0" is outputted to the AND circuit 407.

The AND circuit 407 calculates the AND of the discrimination results from the discrimination circuits 404 and 406 and outputs the result to the DCT circuit 302 as a motion discrimination signal.

In the DCT circuit 302, the DCT mode is selected by the motion discrimination signal inputted from the motion discrimination circuit 105 and executes the DCT processing of the digital image signal inputted from the memory 301 in accordance with the selected DCT mode (frame: 0, field: 1). The DCT coefficients as a DCT processing result are inputted to the zigzag scanning circuit 303.

The zigzag scanning circuit 403 permutates the DCT coefficients inputted from the DCT circuit 302 in accordance with a preset order of the zigzag scan and supplies to the compression coding circuit 304. The DCT coefficients inputted to the compression coding circuit 304 are compression coded and outputted to the recorder or the like.

A construction of a coding apparatus of the fifth embodiment is similar to that of FIG. 15 described in the fourth embodiment except that a construction of the motion discrimination circuit 305 differs.

Figure 18:
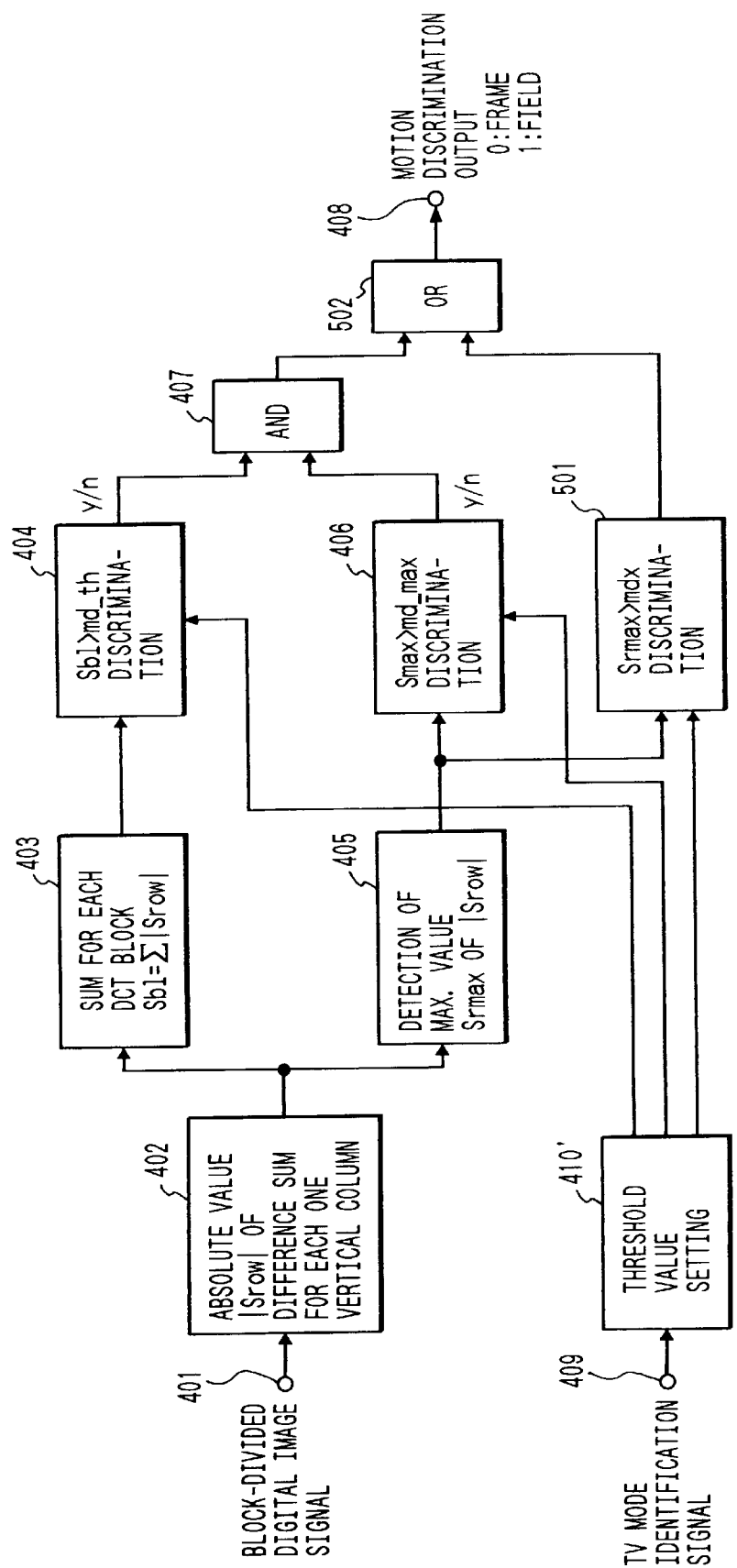
FIG. 18 is a block diagram showing an internal construction of a motion discrimination circuit 305 in the fifth embodiment.

FIG. 18 is a block diagram showing an internal construction of the motion discrimination circuit 305 of the fifth embodiment. In FIG. 18, the same component elements as those in FIG. 16 are designated by the same reference numerals and their descriptions are omitted.

In FIG. 18, reference numeral 501 denotes a circuit for comparing the maximum value Srmax of the absolute value of the sum of the interfield differences of one column in the vertical direction outputted from the detection circuit 405 with a threshold value mdx, thereby discriminating whether Srmax>mdx or not. Reference numeral 502 denotes an OR circuit to calculate the OR (motion discrimination signal) of the output of the AND circuit 407 and the output of the discrimination circuit 501.

The threshold value mdx can be set to an arbitrary value every TV mode by a threshold value setting circuit 410'.

The processing operation of the coding apparatus constructed as mentioned above will now be described.

The circuit 402 which received the digital image signal (block unit) from the input terminal 401 calculates the absolute value |Srow| of the sum of the interfield differences. |Srow| is outputted to the circuits 403 and 405.

The circuit 403 calculates the sum Sb1 of the absolute values |Srow| outputted from the circuit 402 on a block unit basis and outputs the result to the discrimination circuit 404. The discrimination circuit 404 compares the sum Sb1 outputted from the circuit 403 with the threshold value md_th, thereby discriminating whether Sb1>md_th or not. When it is true, the discrimination circuit 404 outputs "1" to the AND circuit 407. When it is false, "0" is outputted to the AND circuit 407.

On the other hand, the circuit 405 detects the maximum value Srmax in the block of the absolute values |Srow| outputted from the circuit 402 and supplies to the discrimination circuits 406 and 501. The discrimination circuit 406 compares the maximum value Srmax with the threshold value md_th, thereby discriminating whether Srmax>md_th or not. When it is true, the discrimination circuit 406 outputs "1" to the AND circuit 407. When it is false, "0" is outputted to the AND circuit 407.

The AND circuit 407 calculates the AND of the discrimination results from the discrimination circuits 404 and 406 and supplies the result to an OR circuit 502.

On the other hand, the discrimination circuit 501 compares the Srmax with the threshold value mdx, thereby judging whether Srmax>mdx or not. When it is true, the discrimination circuit 501 outputs "1" to the OR circuit 502. When it is false, "0" is outputted to the OR circuit 502. The OR circuit 502 calculates the OR of the output (AND) of the AND circuit 407 and the discrimination result of the discrimination circuit 501 and supplies the result to the DCT circuit 302 as a motion discrimination signal.

Many modifications and variations of the present invention are possible without departing from the spirit and main features of the invention.

For example, although the size of image processing block has been set to (8×8) pixels in each of the above embodiments, the invention is not limited to it. For instance, now assuming that the image processing block is set to (16×16) pixels, the size of processing block of the frame orthogonal transformation is equal to (16×16) pixels because it is similar to the size of image processing block. The size of processing block of the field orthogonal transformation is equal to (8×16) pixels.

In other words, the foregoing description of the embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A coding apparatus comprising:
    a) input means for inputting an image signal;
    b) block forming means for dividing said image signal into blocks of pixels;
    c) orthogonal transforming means which can execute orthogonal transformations of at least two kinds of transforming systems including frame units and field units every said block;
    d) processing selecting means for selecting the transforming system of said orthogonal transforming means; and
    e) coding means for coding the image signal transformed by the transforming system selected by said selecting means,
   wherein said processing selecting means includes:
    f) first operating means for arithmetically operating an absolute value of a difference between first field data and second field data of one column in the vertical direction of said block;
    g) first calculating means for calculating a maximum difference absolute value from said difference absolute values which were sequentially operated in the horizontal direction in said block; and
    h) selecting means for selecting said transforming system in accordance with the maximum difference absolute value in said block.

2. An apparatus according to claim 1, wherein said processing selecting means further has second operating means for arithmetically operating the sum of said difference absolute values in said block,
    and wherein said selecting means selects said transforming system in accordance with the sum of said difference absolute values.

3. An apparatus according to claim 1, wherein said selecting means includes comparing means for comparing said maximum difference absolute value with a predetermined threshold value and selects said transforming system in accordance with a comparison result of said comparing means.

4. An apparatus according to claim 3, wherein said input means can input image signals of various broadcasting systems and said predetermined threshold value can be set every broadcasting system.

5. An apparatus according to claim 1, wherein said processing selecting means further has second calculating means for calculating the number of difference absolute values exceeding a predetermined value from said difference absolute values which were sequentially operated in the horizontal direction in said block, and said selecting means selects said transforming system in accordance with a calculation result of said second calculating means.

6. A coding apparatus comprising:
    a) input means for inputting an image signal;
    b) block forming means for dividing said image signal into blocks of pixels;
    c) orthogonal transforming means which can execute orthogonal transformations of at least two kinds of transforming systems including frame units and field units every said block;
    d) processing selecting means for selecting the transforming system of said orthogonal transforming means; and
    e) coding means for coding the image signal transformed by the transforming system selected by said selecting means, wherein said processing selecting means includes:

f) operating means for arithmetically operating an absolute value of a difference between first field data and second field data of one column in the vertical direction of said block;

g) calculating means for calculating the number of difference absolute values exceeding a predetermined value from said difference absolute values which were sequentially operated in the horizontal direction in said block; and h) selecting means for selecting said transforming system in accordance with a calculation result of said calculating means.

7. An apparatus according to claim 6, wherein said input means can input image signals of various broadcasting systems and said predetermined value can be set every broadcasting system.

8. A coding apparatus comprising:

a) input means for inputting an image signal, said input means being able to input image signals of various broadcasting systems;

b) block forming means for dividing said image signal into blocks of pixels;

c) orthogonal transforming means which can execute orthogonal transformations of a plurality of transforming modes including frame units and field units on every said block;

d) mode setting means for setting the transforming mode from among the plurality of transforming modes; and e) coding means for coding the image signal transformed by the transforming mode set by said mode setting means, wherein said mode setting means includes:

f) operating means for arithmetically calculating a difference value between first field data and second field data in said block; and g) setting means for comparing the difference value with a predetermined threshold value and setting the transforming mode on the basis of a comparison result, the predetermined threshold value being varied in accordance with the broadcasting system of the input signal.

9. An apparatus according to claim 8, wherein said input means is for selectively inputting a high definition image signal and a standard definition image signal.

10. An apparatus according to claim 8, wherein said operating means arithmetically calculates an absolute value of a difference between first field data and a second field data of one column in the vertical direction of said block, and said setting means calculates a number of the difference absolute values exceeding the predetermined value from said difference absolute values which were sequentially calculated in the horizontal direction in said block and sets the transforming mode in accordance with a calculation result obtained by said setting means.

11. An apparatus according to claim 8, wherein said operating means arithmetically calculates an absolute value of a difference between first field data and second field data of one column in the vertical direction of said block and said setting means calculates a maximum difference absolute value from said difference absolute values which were sequentially calculated in the horizontal direction in said block and sets the transforming mode in accordance with the maximum difference absolute value in said block.

12. A coding method comprising the steps of:

a) inputting an image signal;

b) dividing said image signal into blocks of pixels;

c) selecting one transforming system from at least two kinds of orthogonal transformations, including frame units and field units every said block; and d) coding the image signal transformed by the transforming system selected in said selecting step, wherein said selecting step includes:

e) arithmetically operating an absolute value of a difference between first field data and second field data of one column in the vertical direction of said block;

f) calculating a maximum difference absolute value from said difference absolute values which were sequentially operated in the horizontal direction in said block; and g) selecting said transforming system in accordance with the maximum difference absolute value in said block.

13. A coding method comprising the steps of:

a) inputting an image signal;

b) dividing said image signal into blocks of pixels;

c) selecting one transforming system from at least two kinds of orthogonal transformations, including frame units and field units every said block; and d) coding the image signal transformed by the transforming system selected in said selecting step, wherein said selecting step includes:

e) arithmetically operating an absolute value of a difference between first field data and second field data of one column in the vertical direction of said block;

f) calculating the number of difference absolute values exceeding a predetermined value from said difference absolute values which were sequentially operated in the horizontal direction in said block; and g) selecting the transforming system in accordance with a calculation result of said calculating step.

14. A coding method comprising the steps of:

a) inputting an image signal, said input step being able to input image signals of various broadcasting systems;

b) dividing said image signal into blocks of pixels;

c) orthogonally transforming the image signal every said block, said orthogonal transforming step being able to execute orthogonal transformations of plurality of transforming modes including frame units and field units every said block;

d) setting the transforming mode from among the plurality of transforming modes; and e) coding the image signal transformed by the transforming mode set in said setting step, wherein said setting step includes:

f) arithmetically calculating a difference value between first field data and second field data in said block; and g) comparing the difference value with a predetermined threshold value and setting the transforming mode on the basis of a comparison result, the predetermined threshold value being varied in accordance with the broadcasting system of the image signal that was input in said inputting step.

* * * * *

UNITED STATES PATENT AND TRADEMARK OFFICE
CERTIFICATE OF CORRECTION

PATENT NO.   : 6,028,636
DATED        : February 22, 2000
INVENTOR(S)  : IZUMI MATSUI, ET AL.

It is certified that error appears in the above-identified patent and that said Letters Patent is hereby corrected as shown below:

IN THE DRAWINGS:

Sheet 9 of 17, FIG. 10, "SUBTRACTOR" should read --SUBTRACTER--;
Sheet 11 of 17, FIG. 12, "SUBTRACTOR" should read --SUBTRACTER--;
Sheet 12 of 17, FIG. 13, "THESE VALUE" should read --THESE VALUES--; AND
Sheet 13 of 17, FIG. 14, "SUBTRACTOR" should read --SUBTRACTER--.

COLUMN 2:

Line 13, "a" (first occurrence) should be deleted; and
Line 45, "orthogonal" should read --orthogonally--.

COLUMN 4:

Line 4, "FIG. 16" should read --FIG. 16 is--; and
Line 34, "adder-substractor" should read --adder-substracter--.

COLUMN 5:

Line 23, "to" should read --into--;
Line 35, "adder-substractor" should read --adder-substracter--;
Line 37, "substractor" should read --substracter--; and
Line 57, "similar-to" should read --similar to--.

UNITED STATES PATENT AND TRADEMARK OFFICE
CERTIFICATE OF CORRECTION

PATENT NO. : 6,028,636

DATED : February 22, 2000

INVENTOR(S) : IZUMI MATSUI, ET AL.

Page 2 of 3

It is certified that error appears in the above-identified patent and that said Letters Patent is hereby corrected as shown below:

COLUMN 6:

Line 37, "field" should read --field of--;
    Line 40, "exists" should read --exist--; and
    Line 48, "adder-substractor" should read --adder-substracter--.

COLUMN 8:

Line 16, "value" should read --value for--;
    Line 43, "result" should read --results--; and
    Line 54, "supplies" should read --supplies them--.

COLUMN 9:

Line 10, "value" should read --value for--;
    Line 30, "supplies" should read --supplies them--;
    Line 39, "result" should read --results--;
    Line 47, "result" should read --results--; and
    Line 59, "of" should read --of the--.

UNITED STATES PATENT AND TRADEMARK OFFICE
CERTIFICATE OF CORRECTION

PATENT NO.   : 6,028,636

DATED   : February 22, 2000

INVENTOR(S)   : IZUMI MATSUI, ET AL.

It is certified that error appears in the above-identified patent and that said Letters Patent is hereby corrected as shown below:

<u>COLUMN 12</u>:

Line 48, "plurality" should read --a plurality--.

Signed and Sealed this

Twenty-second Day of May, 2001

*Attest:*

NICHOLAS P. GODICI

*Attesting Officer*     Acting Director of the United States Patent and Trademark Office